United States Patent
Becker

(10) Patent No.: US 8,396,898 B2
(45) Date of Patent: Mar. 12, 2013

(54) METHOD FOR PROVIDING OR OPERATING A FRAMEWORK FOR THE REALIZATION OF INDEPENDENTLY DEVELOPED PROGRAMS

(76) Inventor: Stefan Becker, Gaildorf (DE)

( * ) Notice: Subject to any disclaimer, the term of this patent is extended or adjusted under 35 U.S.C. 154(b) by 511 days.

(21) Appl. No.: 12/600,043

(22) PCT Filed: May 20, 2008

(86) PCT No.: PCT/EP2008/004032
§ 371 (c)(1),
(2), (4) Date: Feb. 17, 2010

(87) PCT Pub. No.: WO2008/141801
PCT Pub. Date: Nov. 27, 2008

(65) Prior Publication Data
US 2010/0287212 A1  Nov. 11, 2010

(30) Foreign Application Priority Data
May 21, 2007  (EP) .................................. 07010088

(51) Int. Cl.
*G06F 17/30* (2006.01)
(52) U.S. Cl. ...................................................... 707/802
(58) Field of Classification Search .................. 707/760, 707/803, 802
See application file for complete search history.

(56) References Cited

U.S. PATENT DOCUMENTS

| | | | | |
|---|---|---|---|---|
| 5,542,078 A * | 7/1996 | Martel et al. | ............................. | 1/1 |
| 5,937,402 A * | 8/1999 | Pandit | ..................................... | 1/1 |
| 6,085,198 A * | 7/2000 | Skinner et al. | ......................... | 1/1 |
| 2002/0035559 A1* | 3/2002 | Crowe et al. | ....................... | 707/2 |
| 2003/0208486 A1* | 11/2003 | Dettinger et al. | ................. | 707/6 |
| 2005/0038786 A1* | 2/2005 | Yonts | .................................... | 707/9 |
| 2005/0065966 A1* | 3/2005 | Diab | .............................. | 707/102 |
| 2006/0117294 A1* | 6/2006 | Vogler | ............................ | 717/104 |
| 2006/0230066 A1* | 10/2006 | Kosov et al. | ............... | 707/104.1 |
| 2008/0270978 A1* | 10/2008 | Leung | ............................ | 717/106 |
| 2009/0024652 A1* | 1/2009 | Thompson et al. | ............ | 707/102 |
| 2009/0182708 A1* | 7/2009 | Dettinger et al. | .................. | 707/2 |

FOREIGN PATENT DOCUMENTS
WO  WO 02/01418  1/2002

OTHER PUBLICATIONS
International Search Report for PCT/EP2008/004032 mailed Aug. 19, 2008.

* cited by examiner

*Primary Examiner* — Sherief Badawi
(74) *Attorney, Agent, or Firm* — Hershkovitz & Associates, LLC

(57) ABSTRACT

A method for providing a framework to provide a basis for the realization of independently developed programs. The framework comprises at least one database table specification, each said database table specification being centrally provided and comprising a list of table fields, any selection of which can be selected by a program developer to derive an application specific database table including selected table fields taken from said database table specification and optionally one or more further application specific table fields. The framework automatically creates a basic database table and a program developer only concerns himself with said application specific database table and not with said basic database table. The method involves the use of inclusive and selective inheritance of database tables resulting in great flexibility and substantial benefits in practice.

7 Claims, 7 Drawing Sheets

| Field 1 | Field 2 | Field 3 | ... |
|---------|---------|---------|-----|
| a | 1 | x | ... |
| b | 2 | y | ... |
| c | 3 | z | ... |
| ... | ... | ... | ... |

Fig. 9

| Field 1 | Field 2 | Field 3 | ... |
|---------|---------|---------|-----|
| a | 1 | x | ... |
| b | 2 | y | ... |
| c | 3 | z | ... |
| ... | ... | ... | ... |

Fig. 10

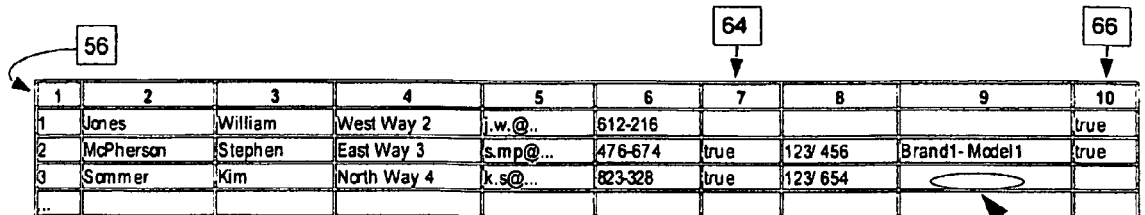
Fig. 11
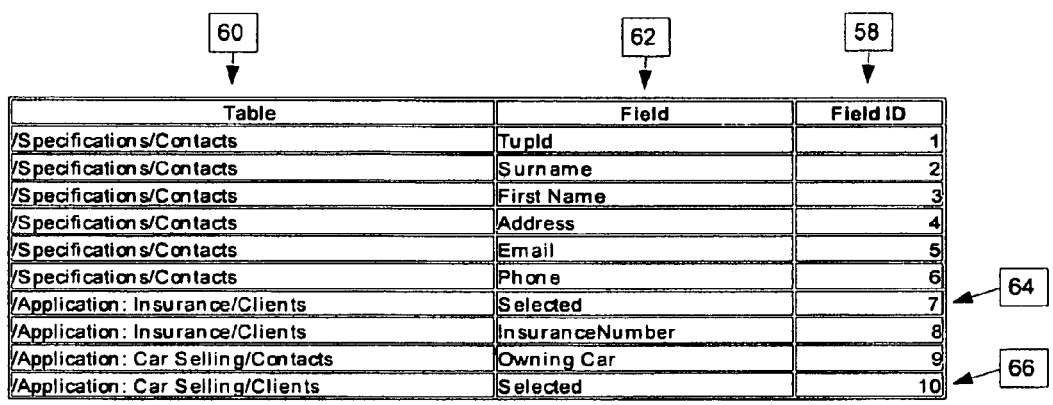
Fig. 12
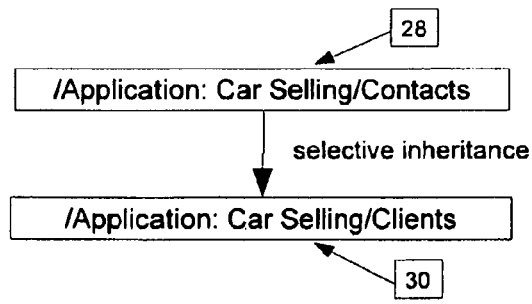
Fig. 13
| 1 | 2 | 3 |
|---|---|---|
| 1 |  | true |
| 2 | Brand1-Model1 | true |
Fig. 14
| Table | Field | Field ID |
|---|---|---|
| /Application: Car Selling/Contacts | TupId | 1 |
| /Application: Car Selling/Contacts | Owning Car | 2 |
| /Application: Car Selling/Clients | Selected | 3 |
Fig. 15

METHOD FOR PROVIDING OR OPERATING A FRAMEWORK FOR THE REALIZATION OF INDEPENDENTLY DEVELOPED PROGRAMS

FIELD OF INVENTION

The present invention relates to a method and framework to provide and operate a basis for the realization of independently developed programs and to related apparatus.

The vast majority of organizations (e.g. companies) have a computer system but invariably one in which the different applications are not rationally organized to use data from sources within the system without redundancy problems occurring. Generally speaking the systems operated involve various pieces of data being duplicated, triplicated and frequently multiplicated in different databases.

A typical average sized organization's computer based applications involve, for example:

- the need to manage correspondence (including email, fax, answering machines etc.)
- the need to schedule tasks such as appointments and task lists
- the need to manage documents, e.g. to implement or move towards a paperless office
- the need to handle Customer Relationship Management (CRM) (e.g. to document correspondence and telephone discussions or other interactions with customers)
- the need to permit Enterprise Resource Planning (ERP) (e.g. to organize which items of freight will be shipped with individual trucks and at what time or which parts are required or have to be ordered to manufacture a specific product)
- the need to manage the company's accounting system
- the need to provide network user authentication (e.g. via LDAP Lightweight Directory Access Protocol) to manage user rights to access specific computer systems In most cases each application within the computer system implements its own database structure. Usually, it is an extensive task for network administrators to create and maintain interfaces between each application causing significant expenses.

SUMMARY OF THE INVENTION

It is an object of the present invention to provide a framework which enables a plurality of program developers to realize independently developed programs which makes rational use of data present in the system and makes it much easier and less time consuming and costly for program developers to draw up new application programs for use by the company or organization operating the computer system.

It is another object of the present invention to provide such a framework (or development framework) which enables a variety of different programmers to work independently of one another but still make efficient use of existing stored data.

In order to satisfy this object there is provided a method for providing or operating a framework to provide a basis for the realization of independently developed programs, said framework operating with at least one database table specification (DTS), each said DTS being centrally provided and comprising at least one table field specification (TFS), each said TFS having a unique table field identification (TFID) within said DTS, wherein:

(a) a selection of one TFS or a plurality of table field specifications (TFSs) within said DTS is used to derive a database table definition (DTD), said DTD including said selection of one or more TFS(s) and optionally one or more additional TFS(s), said additional TFS(s) being defined within said DTD, each said additional TFS having a unique TFID within said DTD;

(b) the framework provides or creates an application specific database table (ASDT) from said DTD, said ASDT comprising a table field (TF) or a plurality of table fields (TFs) generated from said selection of one or more TFS(s) and said ASDT comprising none, one or more additional TF(s), said additional TF(s) being generated from said additional TFS(s) and (c) the framework provides or creates a basic database table (BDT) from said DTS, said BDT comprising at least TF(s) generated from said selection of one or more TFS(s).

This method has the advantage that the end users can make a selection of the most desired applications available for each relevant area (some examples have been given above), which have been provided by program developers using a common framework in accordance with the present teaching. Such application programs are thus inherently compatible, because they are all based on the system described. Although each application can be developed independently without knowledge of each other, intersecting information, i.e. data which is needed for a variety of applications (in the most simple case the name and address of a customer for invoicing purposes (accounting application) and for delivery purposes (resources planning application)) is physically stored only once in the system.

This does not mean that an application developer has to adopt the tables specified in the system. The program developer for each application can define his own set or sets of tables by reference to (e.g. by inheritance of) an existing database table as is described in more detail below. The program developer is free to create the database table structure within any particular application in a way he wishes. A very basic feature is also the fact that derived (inherited) database tables can be extended by table fields, e.g. if the database table specification of contacts does not incorporate the color of the contact's eyes, the application developer is free to extend the table field including the color of the eyes in his inherited database table (as an example of an added table field as described in (b)). The tables created by the program developer can be derived again if it helps to achieve a desired structure within a program developer's application.

However, it is the framework which will ensure that data items present in the computer system, e.g. the names and addresses of a variety of persons, are automatically accessed by each application according to the inheritance relations, the application developer defines.

Hence, the internal data structure of the present invention can be used to provide a data-based interface between several applications based on one single system incorporating the framework of the present invention.

Moreover can he same structure be used to share and exchange data between several systems of the same kind. Two companies are taken as an example, each operating a system used as a common basis for all major internal applications. The internal data structure of each system now yields an interface to every other system of the same kind, even though the two companies might have totally different individual applications. Those systems can very easily share and exchange arbitrary data being stored in any database table, which was derived from a database table specification (DTS). A simple example, again, are contact details. The use of the same data structure, thus, yields an interface which is very deeply incorporated in each system and at the same time requires little effort to maintain and is easy and obvious to use for program developers.

The present invention is seen as a new approach in the field of software design and development. The "traditional" way of making different applications interact with each other is the definition of an interface. Application data is usually provided a very application specific way. This means e.g., that one specific application "a" provides an application "a"-specific interface. An application "b" intending to interact with application "a" has to implement the "a"-specific interface.

Not only does the correct operation of each interface always have to be assured involving significant effort, but also is the program user forced to use only applications providing applicable specific interfaces.

There are further advantages. For example, if a user of one application alters the address entry of a person in a database table (which may actually be a virtual table with respect to some or all of the entries therein), also assuming that the authenticated user has the right to modify this specific address entry, then this address entry is actually only effected by the computer system based on the framework in one address database table, since the system physically only keeps one database table of addresses, which is a basic database table (BDT). This one physical table is located and modified by the system. Hence, all other applications accessing this specific address entry instantaneously access the updated entry. "Traditionally", an updated entry has to go through interfaces synchronizing the data for other applications, which usually leads to delays.

Furthermore, a plurality database table specifications (DTSs) is provided, each said DTS of said plurality having a unique table identification (TID) within said plurality.

An application developer benefits from the system using a plurality of specifications as a basis, as his or her application with specific or specialized features is based on an infrastructure common to the basis of other applications which can in principal be arbitrarily and seamlessly integrated into the functionalities embodied in the specific application.

Hence, the system described in the present invention is a tool allowing individual software developers to participate in and contribute to a maximum customized system without any need to implement interfaces in the traditional manner.

The end user benefits from a selection of applications, from which he or she can select that one or those ones he or she prefers and these can be specialized for the end user's needs. The system design allows application software to be exchanged or replaced as desired with other application software from which the end user has a greater benefit, without the need to export and import data and with either no effort or a significantly reduced effort compared to a change of an application designed as hitherto.

An advantage when operating the framework is described in claim 3, wherein said step of providing or creating a BDT from said DTS, said BDT only comprising TF(s) generated from said selection of one or more TFS(s). The fact that the framework only provides or creates TF(s) within the basic database table, which are derived by application specific tables and are thus actually in use, saves storage capacity and gains operation speed.

The implementation of the framework might require some freedom which is given when a BDT or a ASDT optionally comprises one or more TF(s) defined neither within a DTS nor within a DTD.

Hitherto, it is described how a first application specific database table is derived using a DTS. It is now described in more detail, how redundancies are avoided deriving a further application specific database table using the same DTS:

A further selection of one or more TFS(s) within said DTS can be used to derive a further DTD, said further DTD including said further selection of one or more 'TFS(s) and optionally one or more additional TFS(s), said additional TFS(s) being defined within said further DTD, each said additional TFS having a unique TFID within said further DTD;

(e) the framework provides or creates a further ASDT from said further DTD, said further ASDT comprising one or more TF(s) generated from said further selection of one or more TFS(s) and said further ASDT comprising none, one or more additional TF(s), said additional TF(s) being generated from said additional TFS(s) from (d) and (f) the framework altering said BDT by adding none, one or more TF(s) generated from said further selection of one or more TFS(s), each said TF to be added having to meet the following condition: said TF to be added is not already existing within said BDT.

The framework described in the present invention does not force the developer into a given structure. In fact, the framework helps the developer to improve the structure of his or her own data. For this reason, (g) another selection of one or more TFS(s) within a DTD or a further DTD is used to derive another DTD, said another DTD including said another selection of one or more TFS(s) and optionally one or more additional TFS(s), said additional TFS(s) being defined within said another DTD, each said additional TFS having a unique TFID within said another DTD and (h) the framework provides or creates another ASDT from said another DTD, said another ASDT comprising one or more TF(s) generated from said another selection of one or more TFS(s) and said another ASDT comprising none, one or more additional TF(s), said additional TF(s) being generated from said additional TFS(s) from (g).

In order to visualize the consequences of the methods before, (i) a BDT or a ASDT or a further ASDT or another ASDT is used as a parent database table (PDT) or as a child database table (CDT);

(j) a CDT is derived from a PDT either as in (a) and (b) or as in (d) and (e) or as in (g) and (h) to form a family tree of database tables;

(k) said framework comprises one or more said family trees and comprises at least one PDT and at least one CDT, each said PDT and each said CDT having a table identification which is unique within said framework.

Important details to know about a DTS so that it can be correctly used by program developers are that it comprises at least:

a data type for each said TFS within said DTS;

a descriptive definition of the content of each said TFS within said DTS.

Moreover, through this general description of table fields the end user is able to remain independent of specific used database systems. This means, that the framework of the present teaching does not necessarily need to provide data-storage itself but can also make use of one of many available database systems, i.e. backend database system (e.g. an SQL-database). The framework organizes the "raw"-data, which can be stored in a database system. The data however is provided to individual applications based on the framework in a predictable manner, i.e. parent and child database tables and a well defined API (Application Programming Interface).

For example, if an end user has one proprietary backend database system and program applications which operate using the framework provided by the present invention, then the end user can, if he chooses, change one backend database system for another without having to change or modify the applications. As an example, this step can become necessary if a company which is growing finds a currently used backend database system is providing too little performance at a some point in time.

Hitherto, database tables defined are virtual. However, data eventually has to be stored somewhere and thus, parent and said child database tables have to become physical, meaning (l) the framework provides or creates a physical representation from said PDT (PRPDT) within a database system, said PRPDT comprising a database table being provided or created within said database system, said database table comprising at least one TF for each TF being defined within a DTS or a DTD or a further DTD or another DTD used to provide or create said PDT as in (a) and (b) or as in (d) and (e) or as in (g) and (h) and (m) each said TF within said PDT being uniquely linked to said one or more TF(s) within said PRPDT.

Obtaining stored data involves the step of querying a TF defined within a PDT using the framework to;

(n) deduce said unique link from (m) to obtain at least one TF within said PRPDT from said TF within said PDT being queried, wherein the query is performed within said PRPDT using said obtained TF(s) and using the framework to form a result.

It might be required to uniquely identify a tuple stored within the system. This is achieved by the framework to provide or create an additional TF within said PRPDT containing a tuple identification (TupId), said TupId being unique for each tuple within the PRPDT.

For the CDT to become physical, (p) the framework provides or creates a physical representation from said CDT (PRCDT) within said database system, said PRCDT comprising a database table being provided or created within said database system, said database table comprising at least one TF for each TF being defined within a DTS or a DTD or a further DTD or another DTD used to provide or create said CDT as in (a) and (b) or as in (d) and (e) or as in (g) and (h) and;

(q) each said TF within said CDT being uniquely linked to said one or more TF(s) within said PRCDT and;

(r) the framework provides or creates an additional TF within said PRCDT containing a TupId, said TupId being unique for each tuple within the PRCDT.

This concept of deriving (inheriting) a child database tables from a parent database is a highly practical way of allowing pieces of information to be stored just once in the computer system and avoids redundancy of data storage and the associated complications while maintaining a high degree of flexibility for the application developer to design his or her individual database table structure. If the system is applied correctly all pieces of information needed by more than one application is physically stored in basic database tables which are handed down or bequeathed to application specific database tables, i.e. inherited by them from the basic database table.

The present invention features two ways of deriving (inheriting) database tables, namely by inclusive inheritance and by selective inheritance.

Inclusive inheritance means the formation of a child database table (CDT) from a parent database table (PDT) in such a way that the inherited database table, the child database table (CDT), comprises a subset of table fields of the parent database table (generally fewer table fields than in the parent database table (but could be all table fields of the parent database table)) but with the number of tuples in the child database table (CDT) being the same as in the parent database table (PDT), i.e. including all the tuples of the parent database table.

Selective inheritance means the formation of a child database table (CDT) from a parent database table (PDT) in such a way that the inherited database table, the child database table, comprises a subset of table fields of the parent database table (generally fewer table fields than in the parent database table (but could be all table fields of the parent database table)) but with the tuples of the child database table being a subset (selection) of the tuples in the parent database table.

These two ways of deriving database tables form a powerful tool giving a program developer more flexibility in designing the inner organization of his or her application. There are three main operations on database tables:
 querying (meaning investigating whether a piece of information is present there),
 inserting tuples and
 updating tuples.

In order to describe the methods of carrying out these three main operations it is necessary to distinguish between database tables which are inclusively inherited and database tables which are selectively inherited.

Querying Operations Applicable to both Inclusive and Selective Inheritance

There is one type of querying operation, which applies to both kinds of inheritances. This is the method of querying a table field within a child database table (CDT) derived from a parent database table (PDT) (i.e. inclusively or selectively inherited from a parent database table (PDT)), said table field being defined only within the child database table (CDT). The method comprising performing the query on the physical representation of the child database table (PRCDT) resulting in either no tuple, one tuple or a plurality of tuples containing the piece of information sought and, in the case of one or more such tuples, finding for each said tuple a respective unique identification in said physical representation of the parent database table (PRPDT) and table fields for each tuple found in the physical representation of the parent database table (PRPDT) being appended to the said individual tuple to form a result of the query containing all desired table fields of the child database table (CDT). In SQL terminology this specific operation would be described as: "PRPDT inner join PRCDT using (TupId)". In this case, the same result is obtained using "PRPDT left join PRCDT using (TupId)".

The difference between the two ways of inheriting a database table comes into play in the following examples.

Querying Operations in the Case of Inclusively Inherited Tables

One example relates to the operation of querying a table field within a child database table derived (inclusively inherited) from a parent database table (PDT), said table field being derived (inherited) from said parent database table (PDT). In this case the method comprises the steps of performing the query on the physical representation of the parent database table (PRPDT) resulting in either no tuple, one tuple or a plurality of tuples containing the piece of information sought and, in the case of one or more such tuples, finding for each said tuple a respective TupId in said physical representation of the child database table (PRCDT) and, irrespective of whether a TupId is found in the physical representation of the child database table (PRCDT) or not, the associated tuple from the physical representation of the parent database table (PRPDT) remains among the query result, and if present in -the physical representation of the child database table (PRCDT), desired pieces of information from this tuple of the physical representation of the child database table (PRCDT) are provided as at least a part of the query result and table fields defined in the child database table (CDT) but not derived from the parent database table (PDT) are appended to the said individual tuple to form a result of the query containing all desired table fields of the child database table (CDT). In SQL terminology this specific operation would be described as: "PRPDT left join PRCDT using (TupId)".

The above described kind of inheritance forms a subset of table fields of the inherited parent database table allowing the program developer to easily handle the pieces of information required and making it possible for him to handle only these pieces of information.

Insertion Operations in the Case of Inclusive Inheritance

One case of particular interest, which is automatically handled by the framework, is the step of inserting a tuple within a child database table (CDT) derived (inclusively inherited) from a parent database table (PDT), the tuple to be inserted comprising an entry in at least one table field of the child database table (CDT) and said table field being derived (inherited) from the parent database table (PDT). Here the method comprises the further step of using the framework to determine a new unique identification for said tuple (TupId) in said physical representation of the parent database table (PRPDT), and inserting the unique identification (TupId) and the associated individual table field entry or entries associated with the tuple in the physical representation of the parent database table (PRPDT).

A second case which has to be considered is the case of inserting a tuple within a child database table (CDT) derived (inclusively inherited) from a parent database table (PDT), the tuple to be inserted comprising an entry in at least one table field of the child database table (CDT) and said table field being defined only within the child database table (CDT). In this case the method comprises, the further step of using the framework to determine a new unique tuple identification (TupId) for said tuple in said physical representation of the parent database table (PRPDT), and inserting said TupId associated with the tuple in the physical representation of the parent database table (PRPDT) and also inserting the said TupId and the associated individual table field entry in the physical representation of the child database table (PRCDT).

Updating Operations in the Case of Inclusive Inheritance

As a next element of the development, there is the step of updating one tuple within a child database table (CDT) derived (inclusively inherited) from a parent database table (PDT). Here, the said tuple is identified by a unique identification (TupId) for an individual table field within said tuple to be updated defined within the child database table (CDT), the method comprises the step of using the framework to automatically check whether one of the following possibilities exists I) said tuple already exists in the physical representation of the child database table (PRCDT), implying a tuple with a unique identification (TupId) within the physical representation of the child database table (PRCDT) is the same as said unique identification (TupId) of the tuple to be updated, and then updating said individual table field within said tuple to be updated and II) the tuple does not exist within the physical representation of the child database table (PRCDT), and then using the said framework to automatically insert a new tuple into the physical representation of the child database table (PRCDT) having the same identification (TupId) as the corresponding tuple inclusively inherited from the parent database table (PDT) and to insert said individual table field within said tuple to be updated.

Following the description of the querying and inserting operations given above, the updating operation forms a third basic operation on table fields. The description above also refers to tables which are inclusively inherited.

Thus, as in the case of querying and inserting, the case of updating a tuple also includes instances where an update of a tuple can contain table fields inherited from the parent table and defined within the child database table.

Querying Operations in the Case of Selectively Inherited Tables

Here the method comprises the further step of querying the table field within the child database table (CDT) derived by selective inheritance from a parent database table (PDT), meaning the formation of the child database table (CDT) from a parent database table (PDT) in such a way that the derived (inherited) table, the child database table (CDT), comprises a subset of table fields of the parent database table (PDT) (generally fewer table fields than in the parent database table (PDT) (but could be all table fields of the parent database table)) but with the tuples of the child database table (CDT) being a subset (selection) of the tuples in the parent database table (PDT), said querying step being performed on the physical representation of the parent database table (PRPDT) resulting in either no tuple, one tuple or a plurality of tuples containing the piece of information sought and, in the case of one or more such tuples, finding for each tuple a respective unique identification in said physical representation of the child database table (PRCDT) and, in case a TupId is found but only in case a TupId is found, the associated tuple from the physical representation of the parent database table (PRPDT) remains among the query result and desired pieces of information from this tuple of the physical representation of the child database table (PRCDT) are provided as at least a part of the query result with table fields defined in the child database table (CDT) but not derived (inherited) from the parent database table (PDT) are appended to the said individual tuple to form a result of the query containing all desired table fields of the child database table (CDT). In SQL terminology this specific operation would be described as: "PRPDT inner join PRCDT using (TupId)".

Insertion Operations in the Case of Selective Inheritance

The above described kind of inheritance, selective inheritance, forms a subset of table fields and a subset of tuples of the inherited parent database table. Inclusive inheritance only forms a subset of table fields. This feature allows the program developer to easily handle the pieces of information required and makes it possible for him or her to handle only these pieces of information.

The case to consider here is that of inserting a tuple within a child database table (CDT) selectively inherited from a parent database table (PDT), the tuple to be inserted comprising an entry in at least one table field of the child database table (CDT), the method comprising the further step of using the framework to determine a new unique identification for said tuple in said physical representation of the parent database table (PRPDT), and inserting the unique identification in the physical representation of the parent database table (PRPDT) and also inserting the said unique identification in the physical representation of the child database table (PRCDT) and, if said table field (TF) is derived (inherited) from the parent database table (PDT), inserting the associated individual table field entry associated with the tuple in the physical representation of the parent database table (PRPDT) and, if said table field (TF) is defined within the child database table (CDT), inserting the associated individual TF entry associated with the tuple in the physical representation of the child database table (PRCDT).

Updating Operations in the Case of Selective Inheritance

The case to be considered here concerns the step of updating one tuple within a child database table derived (selectively inherited) from a parent database table, the said tuple identified by a unique identification for an individual table field within said tuple to be updated. Here the method comprises the step of using the framework to update said individual table field within the child database table when said table field (TF) is defined within the child database table (CDT) and using the framework to update said individual table field (TF) within the physical representation of the parent database table (PRPDT) when said table field (TF) is derived (inherited) from the parent database table (PDT).

This completes the basic operations of querying, inserting and updating on database tables of the system.

The question might arise how a tuple can be "selected" within a selectively derived database tables. The answer is that one needs to have access to a parent database table or a grand-parent database table (or a further removed predecessor parent database table), which allows the tuple to be identified which is to be "selected".

"Insert" and "update" are established names in the field of data processing for the operations already described. An intuitive name for an operation to "select" a tuple could be "lift", because a tuple is lifted within a family tree into the selectively derived database table, metaphorically speaking.

Those methods described hitherto yield a very efficient implementation of the principle of table specification and derivation (inheriting) in terms of the required storage capacity. Data are organized in database tables such that each table field is actually needed to store required information.

However, a drawback of organizing data in the described methods could occur in terms of performance. A simple query can involve a significant number of tables which can slow down operation speed.

The Concept of Combined Database Tables

In order to achieve better performance e.g. when querying a table being derived several times, how (s) the framework provides or creates from said CDT a physical representation within the database system from (l), wherein the PRPDT from (l) is altered by adding at least one TF for each TF being defined within a DTS or a DTD or a further DTD or another DTD used to to provide or create said CDT as in (a) and (b) or as in (d) and (e) or as in (g) and (h) to form a combined database table, and (t) each said TF within said CDT being uniquely linked to said one or more TF(s) within said combined table.

This method allows maximum performance as a whole family tree of tables is stored in a single physical database table. The drawback of this method lies in the size to which such a combined table can grow, where in general many fields are simply not required as they belong to tables of a different branch of the family tree.

The power of the present teaching now lies in the combination of those two methods, i.e. the fast one concerning performance and the efficient one concerning storage. Depending on the structure and the way of accessing the database tables, a family tree of tables can be broken up at any branch in order to maximize the benefit from both, performance and storage efficiency. This will be explained in more detail later on.

The operation of a combined database table requires some meta-information, as hinted at in (t). A practical way to organize the required meta-information for deducing said unique link from (m) and (t) within a combined database table combining at least one PDT and at least one CDT wherein the framework creates or provides at least one physical look-up database table within said database system, said look-up database table comprising;

(u) a TF including the unique table identification from (k);
(v) a TF including the unique field identification within a DTS or a DTD or a further DTD or another DTD used to to provide or create one of said PDT or one of said CDT as in (a) and (b) or as in (d) and (e) or as in (g) and (h), and
(w) a TF including the designation from (t).

Accessing a table within a family tree of database tables being stored in a combined database table is easier in the sense that it is not required to address several physical tables to obtain a single tuple. The step of querying a TF within a CDT, said CDT and said TF being part of said combined database table, can be done by using the framework to deduce said unique link from (t) to obtain the TF within said combined database table, the query being performed within said combined database table using said deduced TF within said combined database table to form a result of the query containing all desired table fields of the CDT.

The combined table method certainly can also be used to selectively derive a CDT from a PDT, meaning the formation of a CDT from a PDT in such a way that the derive table, the CDT, comprises a subset of table fields of the PDT (generally fewer table fields than in the parent database table (but could be all table fields of the PDT)) and with the tuples of the CDT being a subset (selection) of the tuples in the PDT, said CDT and said PDT being part of said combined database table, and (x) said framework creating or providing at least one additional TF within said combined database table, said additional TF including the information whether a tuple within said selectively derived CDT is present or not.

In order to query a TF within a CDT selectively derived from a PDT, said CDT and said TF being part of said combined database table, the framework can be used to deduce said unique link from (t) to obtain the TF within said combined database table, the query being performed within said combined database table using said deduced TF and said additional TF from (x) within said combined database table resulting in either no tuple, one tuple or a plurality of tuples containing the piece of information sought, and for each said resulting tuple, the state of selection is checked using said additional TF from (x) and, in case of said additional TF from (x) indicating the state of selection, said resulting tuple remaining among the query result.

This completes the basic operations of querying combined tables. Other operations in conjunction with combined database tables, such as insert or update, are straight forward because, as already mentioned, it is only one physical table that needs to be addressed.

Another method is used to extend the flexibility of the framework wherein a further DTS within said plurality of DTSs being derived from a DTS within said plurality of DTSs, comprises the step of using the framework to treat said further DTS like a DTD.

All claims described hitherto concern the interaction of independently developed applications.

The Concept of Using Table Specifications to Provide Services

Besides from only storing data, the framework of this teaching allows applications based on the framework to make use of certain services, which are also described by the DTS.

One obvious service wherein a specific DTS provides the service of handling binary data in conjunction with each tuple within a said specific BDT generated from said specific DTS, the method comprises the step of using the framework to handle said binary data and to provide a streaming object to access said binary data.

If an application requires to deal with binary data, the framework provides a very elegant and flexible way to do so.

There is a variety of applications dealing with multi-media data, e.g. applications playing audio data or video data. Moreover, the ability for storing document data is widely required, e.g. for realizing a paperless office and using the framework as a basis. The possibility of binary data being subjected to revision control is a further powerful feature.

Many network administrators prefer binary data being stored on file servers where the framework uses at least one file-server to store said binary data in conjunction with each tuple stored within said specific BDT.

Besides handling binary data, examples for further services are the handling of messages such as email, fax, voice messages, etc.

the handling of user authentication, i.e. a DTS comprising authentication data the handling of devices (e.g. printers using a DTS comprising print queues)

The Concept of Table Specifications to Provide Interaction

Another field of applying the framework opens up by taking advantage of the principle of using and deriving DTS(s) to provide a very sophisticated way for entire systems based on the framework to interact with each other. Interaction can be achieved making use of the precise knowledge of the data structure of the communication partner.

In order establish interaction, at least one DTS is used as a connecting DTS being an interface for said framework to interact with one or more further systems, each said further system operating a like said framework, said connecting DTS being used to generate a connecting BDT within said framework and to generate a further BDT, said further BDT being located within said further system operating said like framework and said further system having an identification, said identification being used to identify said further system, wherein (y) said framework creates or provides a system-identification TF (SIDTF) within said connection BDT, said SIDTF being used for storing said identification of said further system and (z) said framework creates or provides a referenced-tuple TF (RTTF) within said connection BDT, said RTTF being used for storing a unique tuple identification (TupId), said TupId identifying a tuple within said further BDT.

The design of the framework includes the case wherein a child database table serves as parent database table for a further child database table, which can also be seen as a recursive continuation of all properties described within this invention. This description makes it possible to set up a family tree of database tables within the framework.

In addition to the possibility of using of the framework to generate a family tree of database tables by selective or inclusive inheritance, there is also the possibility of using the framework to organize all database tables in a hierarchical structure.

This method allows the program developer to easily address a desired database table within the framework due to the hierarchical structure.

Within the hierarchical structure, every program developer has freedom to name his database tables as he wishes without even having to consider whether the database table names have been used before and without having to consider whether the database table names have been used before or used by other program developers writing applications running on the same framework. The hierarchical structure makes this cross checking unnecessary and further simplifies the work of the program developers.

Furthermore, the invention comprises the step of permitting each program developer to build his own hierarchical database table structure to be accessed by each said application.

This method offers a maximum flexibility for each program developer to organize his database tables within the framework.

The Concept of Table Specifications Used for Abstracting Physical Data Storage

A big advantage of such a concept is that the framework maintains its independence from any particular backend database system.

Furthermore, it can be a relational database system being used as a backend database system as well as an object relational database system, and an SQL database system.

The invention will now be described in more detail by way of example and with reference to the accompanying drawings.

BRIEF LISTING OF THE SEVERAL VIEWS OF THE DRAWINGS

FIG. 1 explains the concepts of an entry 6, a table field 8 and a tuple 10,

FIG. 2 shows a possible database table definition in accordance with the present invention within an application;

FIG. 3 shows a database table which is formed from the database table definition of FIG. 1 in accordance with the present invention, FIG. 4 shows a possible centrally provided database table specification in accordance with the present invention, FIG. 5 shows a possible basic database table created in accordance with the present invention from the database table specification of FIG. 4, FIG. 6 shows a possible database table structure of the framework with database tables being hierarchical organized in accordance with the present invention, FIG. 7 shows a the database table structure of FIG. 6 as a family tree of database tables, FIG. 8 shows an example of the data structure of two independent applications based on the same database table specification, FIG. 9 shows an example of a physically existing database table, FIG. 10 shows an example of a virtual database table, FIG. 11 shows the data structure of example of FIG. 8 using the concept of a combined database table, FIG. 12 shows a lookup-table for the combined database table of FIG. 11, FIG. 13 shows a branch of the family tree of FIG. 7, FIG. 14 shows the data structure of the branch of FIG. 13 using the concept of a combined database table, FIG. 15 shows a lookup-table for the combined database table of FIG. 14, FIG. 16 shows a detail of another data structure explaining the concept of referencing tuples stored within the data structure of FIG. 8, FIG. 17 shows an example of a possible specific DTS and the corresponding BDT for storing binary data using file-servers, FIG. 18 shows the content of the file-servers used by the example of FIG. 17, FIG. 19 shows an example of the framework operating in a networked environment using a backend database system and a file-server, FIG. 20 shows the framework in more general form and FIG. 21 shows the hardware basis of the framework.

DESCRIPTION OF THE PREFERRED EMBODIMENTS

Turning first to FIG. 1 there can be seen the concepts of an entry 6, a table field 8 and a tuple 10.

FIG. 2 shows a possible database table definition (DTD) "Contacts" with a list of possible entries 12', 12", 12''', 12'''', 12''''', hereafter referred to as table field specifications (TFSs) which can serve in a database table, which will later be described with reference to FIG. 3, as column headings. These column headings will henceforth be referred to as table fields (FS), which is the accepted name for such entries in the field of data processing.

FIG. 3 shows as an example the database table which is formed from the database table definition (DTD) of FIG. 1. and has the table fields Surname 14', First Name 14", Address 14''', Email 14'''', Phone 14'''''.

For the purpose of the present invention, the invention provides a framework which has as a fundamental concept a special kind of database table definition (DTD), later be referred to as database table specification (DTS). Each database table specification (DTS) consists of a possibly large number of distinct table field specifications (TFSs) such as Surname 12', First Name 12", Address 12''', Email 12'''', Phone 12''''', Fax 12'''''', shown in FIG. 3 and a whole variety of further possible entries such as a second and third addresses, second and third e-mail addresses, further telephone numbers, cell phone numbers, fax numbers, date of birth, place of birth, sex, banking details such as branch number, account number, hobbies, married status, citizenship, color of eyes, color of hair, physical handicap, golf handicap, and many others.

An important concept of the invention is that these database table specifications (DTSs) are centrally defined and provided for the operation of the framework.

The properties of these database table specifications (DTS) differ from "usual" database table definitions (DTD) as follows:

While an application specific database table (ASDT) is created from all table fields defined in the "usual" database table definition (DTD), a database table corresponding to a database table specification (DTS) as presented in this invention is only created if at least one table field specification (TFS) among all table field specifications (TFSs) listed in the database table specification (DTS) is requested by at least one application specific database table (ASDT). Database tables created from database table specifications will later be referred to as basic database tables (BDT). Moreover, only table fields (TFs) which are requested at least once from application specific database tables (ASDT) created using the framework are created within the basic database table (BDT). The criterion determining whether a table field (TF) is requested or not will be explained in the following section. FIG. 5 shows a basic database table (BDT) created from the database table specification (DTS) in FIG. 4, where only a subset of table fields namely, Surname 12', First Name 12", Address 12''', Phone 12'''''', are created from this specification. Hence, in this example, not all the table fields specified in the database table specification are actually requested by applications installed in the framework. Indeed it would be very unlikely for all the table fields (TFs) ever to be used in any of the applications installed on the framework.

A program developer developing a computer program for a specific application is free to select any table field specifications (TFSs) from a database table specification (DTS) to derive (inherit) a database table definition (DTD). Those individual database table specifications (DTSs) are a basis for the program he is developing.

In fact, within the concept described by this invention, the computer program may only access database tables which are individually defined for this program. This means, if an application intends to access a basic database table, this basic table first has to be derived (inherited) for said individual definition.

The application specific database table (ASDT) of FIG. 3 and FIG. 5 also has a plurality of rows 14, 14', 14" ... 14$^i$, hereinafter called tuples, tuples being the accepted name for such rows in the field of data processing, as shown in FIG. 1.

One particular advantage of the present invention is that it allows a plurality of different program developers who operate using the same framework to draw up programs for specific applications completely independent of each other, indeed not even knowing one another, but with the programs still interacting in a manner of an intrinsic interface between applications based on the framework, while ensuring a very flexible system. It will be appreciated by those skilled in the art that a data interface is normally a very inflexible data structure which is hard to manage when the programs dependent on it are further developed. In contrast the intrinsic interface provided by the present invention is intended to make the need for such management of the data interfaces superfluous and thus to avoid it.

A first example of the use of the invention will now be explained with reference to FIGS. 6, 7 and 8:

Reference numeral 18 is a block labeled "Table Root" and is to be understood as a basis for the formation of database tables including a database table specification (DTS) 20 and the corresponding basic database table (BDT) 22, which corresponds, for the sake of example, to that shown in FIGS. 4 and 5, and of further application specific database table definitions (DTDs), 24, 26, 28, 30 for the application specific database tables (ASDT, also occasionally referred to as database table later on for the sake of simplicity) 32, 34, 36, 38 within two specific applications, namely an application "Insurance" 40 and an application "Car Selling" 42. That is to say that a first program developer can concern himself with the development of a first "Insurance" program which enables users of his program to manage their day to day insurance business. Box 42 represents a second independent program drawn up by a program developer for use by businesses involved in selling cars. It should be noted that the insurance program need have nothing to do with selling cars, but could be related to it, for example in the sense that a business selling cars could also sell insurances. Both applications share the same contact list, as mentioned, without "knowing of each other". The development concept which provides the multitude of possible database table specifications (DTSs) being arranged beneath the common node indicated by the box 44.

Let us now assume that the program developer concerned with the application "Insurance" now decides that it will be sufficient with respect to his customers to record the Surname, First Name, Postal Address and Email Address of their contacts. It is noted that these contacts are not necessarily clients, i.e. individuals to which insurance has been sold, but also people or firms with whom the insurance company has business relationships or other personal relationships and with whom it may at some stage be necessary to conduct a transaction of some kind for which the contacts particulars are useful.

Let us assume that the program developer first wishes to create a mechanism by which data already known to the framework can be accessed by an end user. Thus the program developer has to provide a mechanism by which a user can see whether a particular person or business is included in the respective database table, which is inherited from the respective database table specification (DTS) within the framework. Thus, the program developer generates a query to the database table, this query is "Do we already know a person "Jones". This query could take the form:

Return all tuples including the table fields "Surname", "First Name", "Address" and "Email" with the following constraint: The table field with the name "First Name" shall be equal to the entry "Jones".

There are now several possibilities: The framework could know a person "Jones" who is uniquely identified in the sense that there is only one of them. The framework could also know other persons having the surname "Jones" and then the program must enable the user to add information for further table fields to identify which of the persons "Jones" is the one to be considered for the particular application, when the insurance business wishes to make an entry relating to this person.

A further possibility is that no person "Jones" is known to the framework. In that case, the program developer could allow the program user to add a person "Jones" to the list of contacts.

Now it can be seen from FIG. 4 that the list of contacts for the application "Insurance" includes "Jones", "McPherson" and "Sommer", all of whom are known to the framework. The question that surely arises is how does the application framework have information concerning "Jones", "McPherson" and "Sommer". The answer is that whenever any particular application adds information relating to a person hitherto unknown to the framework, the relevant information is automatically stored in the basic database table (BDT) of the framework.

Another special feature should now be noted:

The basic database table (BDT) "Contacts" has entries surrounded by double lines. The database table "Contacts" in the application "Insurance" has entries surrounded only by single lines. Moreover, it can be seen that the basic database table (BDT) and the application specific database table (ASDT) "Contacts" for the application "Insurance" have a column (table field heading), "TupId", which is a unique identification of any person whose data is stored in the basic database table (BDT). Now, it can be seen that the database table "Contacts" for the application "Insurance" has a selection of table fields from the basic database table (BDT) and, in this case, the selection can be regarded as a subset of table fields in the sense that not all table fields are present in the application specific database table (ASDT) "Contacts", labeled 32 for the application "Insurance". However, it can also be seen that the application specific database table "Contacts" has an entry for all persons listed in the basic database table (BDT). Thus, all tuples of the basic database table (BDT) are included in the application specific database table (CSDT) "Contacts" and this concept is expressed in this application by the term "inclusive inheritance", meaning that all tuples are to be found in the application specific database table (ASDT) "Contacts" for the application "Insurance". Moreover, as all table fields are inherited, all entries are stored in the basic database table. It shall be noted that not all table fields of the basic database table (BDT) are required or in this case desired for the application specific database table (ASDT) "Contacts" for the application "Insurance".

In this case, all table fields of the application specific database table (ASDT) "Contacts" for the application "Insurance" are inherited and hence, stored in the basic database table (BDT). For this reason, no physical database table actually needs to be created and there exists only a virtual database table, which the application "Insurance" can access via the framework and its inherent connection to the basic database table (BDT). In fact, for the application "Insurance", there is no difference in accessing a virtual database table compared to a database table existing physically. This is an example of the framework resolving inherent connections without the program developer having to take care of them.

Let us assume now, that a user for the "Insurance" application sells a policy with the insurance number "123/456" to the person "McPherson" and a policy "123/654" to the person "Sommer". This user creates his own list of clients, as a result of the database table structure defined by the program developer. The tuples of the client's database table "Clients" 34 is a subset of the tuples in the database table "Contacts" for the application "Insurance". This list includes, in addition to the unique identification keys within the table field "TupId" 46, also the numbers of the respective insurance policies "123/456" and "123/654" within the table field "Insurance Number" 48. The program may be so designed that the insurance business sees on a screen the Surname, First Name, Address and Insurance Number involved, in this example for the persons "McPherson", "Sommer". However the only data physically stored for the end user of the application "Insurance" is data relating to the unique identification of each of those two persons "2" and "3", together with the respective policy number "123/456" and "123/654". All other items of information such as the "Surname", "First Name" and the "Address" are physically stored in the basic database table "Contacts" 22 and are accessed automatically via the framework through the application specific database tables 34 and 32. The database table "Contacts" for the application "Insurance" has been "inclusively inherited" from the basic database table 22, because all tuples found in the basic database table are also present in the inherited database table "Contacts" 32. In contrast, the information shown in the "Clients" table 34 for the application "Insurance" has been "selectively inherited", because the information present in that database table represents a selection, meaning a subset, of tuples of the basic database table. Again not all table fields of the tuples of the basic database table are present in the "Clients" database table 34, an inherited database table "Contacts" 32. With respect to the table fields of inherited database tables, there is no difference between "inclusive" and "selective" inheritance. In this example, the database table "Contacts" 32 for the application "Insurance" 40 is a selection made from the table fields present in the database table specification 20.

Thus, with respect to this application "Insurance" the framework provides only one basic database table containing all information entered in relation to a person or persons at some time for some table fields for some application by some user. Each such person is identified in all programs developed using the framework by a unique ID so that this person related data only has to be kept updated at one physical storage location but is nevertheless accessible to any user of an application, and indeed, as shortly will be seen, is also accessible to any other application developed by a program developer using the same framework (and to any user of such an application using the same framework, i.e. the special framework provided by the present invention).

Of course rules have to be created and indeed by the enterprise controlling the framework, as to who has the authority to change data in the framework thus recorded in the basic database table. However, this is no different from any other situation where a large number of diverse users have access to centralized information.

Just to explain one point further, if a user of the insurance application has a new contact, for example a person X, i.e. a person with the "Surname" "Person X", then, when he enters the Surname information, he will see that "Person X" is as yet unknown to the framework. The user then could add the relevant information, in this example the first name, postal address and e-mail address.

FIGS. 6, 7 and 8 also shows a further application "Car Selling" 42. Here the list of contacts shown in the database table "Contacts" for this application is "inclusively inherited" from the basic database table and is supplemented by a further table field 50 regarding the type of car owned. In this case, the car selling business only knows the type of car owned by the person "McPherson". Thus the only information actually stored in the corresponding database table of the car selling business are the unique identification table field 52 and the information in table field 50 on the car owned. For this reason, only the ID "2" and the entry "Brand1-Model1" are shown surrounded by double lines and all other information are "virtual". Actually it is stored in the basic database table 22. Among all of these contacts, it is only the persons "Jones" and "McPherson" who are clients of the car selling business. In this example, no further information is required concerning the clients and hence, the actually existing database table "Clients" within the application "Car Selling" simply consists of the table field 52 "ID", uniquely identifying the respective persons "1" and "2" in the basic database table. This is another example of "selective inheritance", where only some of the tuples of the basic database table (and some of the entries) are present. This example shows the simplest form of selective inheritance, where only the ID numbers are actually stored, here in the database table "Clients". If the car selling business, i.e. a user of the application "Car selling" wishes to look at its client list on the screen then it is able to do so with the particulars of the persons involved being taken from the basic database table and displayed in a suitable form decided on by the program developer. One possibility would be to display the information in the manner of table 38.

Hitherto, tables or entries with the attribute "actually stored or existing" and hence, being surrounded by double lines can imply that those tables or entries are also physically stored within a physical database table within the database system. However, this does not necessarily need to be the case as explained later on when coming to the concept of combined database tables.

Also within the context of this example, the application "Car Selling" accessing its database tables through the framework does not "feel" any difference from a database table, where all table fields actually exist. It is the framework in the background arranging the database table from all inherited information. The program developer relies on this and exploits this when writing any specific application program.

If desired, the car selling business can view another table similar to that shown in the list of clients in FIG. 8 but supplemented by the type of car owned or the car sold by it to the person involved. Such a database table would be another example of "selective inheritance" with additional information being stored.

It should be noted, that inheritance means essentially that a program developer drawing up a program for a new application inherits from the database table specifications, for example 20, a selection of table field specifications and the framework creates in the background the corresponding basic database table. If a program based on the framework is installed as a first application program for a particular user then the basic database table is typically initially devoid of physical entries. These entries first appear when a user of the application, e.g. the customer, starts using the program. If, however, the application is a second or further application then the basic database table can already exist and contain entries made by the user of the first application or other already installed applications. For any particular application the framework then enables basic database tables or other database tables to be inclusively or selectively inherited as described above.

It will be noted that the benefit of the invention and the creation of flexible intrinsic interfaces is only possible if the database tables used in any application are inherited from the framework's database table specifications.

By way of further explanation one could assume that a sensible way of building an interface with another program would be the inheritance of its database tables. However, this is not the case, because if a change is made to the structure of a database table relating to a first application then the interface breaks down and can only be repaired by changing the structure of the corresponding database tables of the other application. If this other application has been provided by another program developer then this becomes very complicated. Hence an interface in accordance with the example just given is very inflexible and maintaining the programs and adapting them is costly and involved.

In contrast, in accordance with the present invention, database table specifications are not altered after having first been specified. Either new database table specifications are added or existing database table specifications are extended by further table fields. Already specified table fields are not allowed to be modified or removed. At the most, already specified table fields can be declared "deprecated" in order to convey to program developers that they should use other table field specifications or adapt existing programs to those other table field specifications in future versions. The reason for this is that individual applications within any one installation based on the framework, e.g a suite of different applications for any one customer such as a firm, a government organization, an enterprise or a school, are not necessarily aware of the database table structure of other applications. Moreover, the developers of programs for applications within one installation do not need to be aware of the details of other programs operating in or intended for the same installation. Simply by insisting on the database table specifications being inherited rather than the database tables of different applications ensures that intrinsic interfaces are created so that changes made to database table structures in a different application of the same installation can be made without any need or reason for changing database table structures in other applications of the same installation. Hence such intrinsic interfaces created by inheriting database table specifications but not database tables are very flexible.

FIG. 9 shows a database table with double lines, meaning that all table fields are actually existent in the respective database table.

FIG. 10 shows a database table with a single line, meaning that all table fields are derived (inherited) from another database table. This means, that the database table is purely virtual and does not actually exist in the database.

Figure 1:
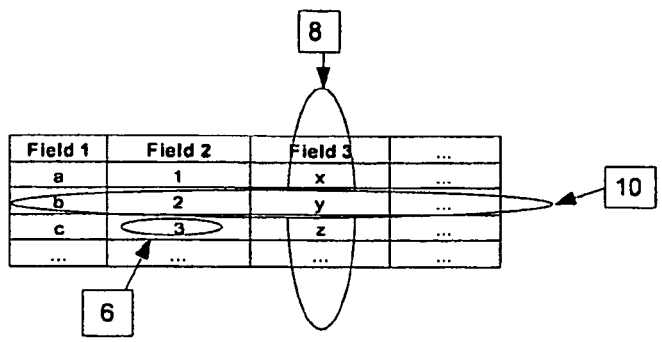
Figure 2:
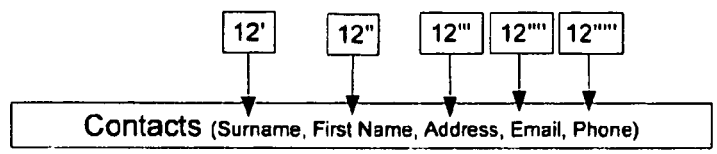
Figure 3:
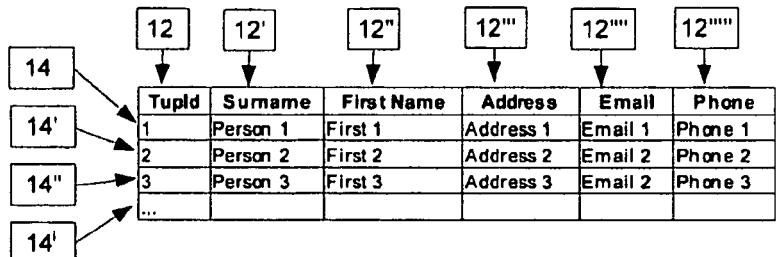
Figure 4:
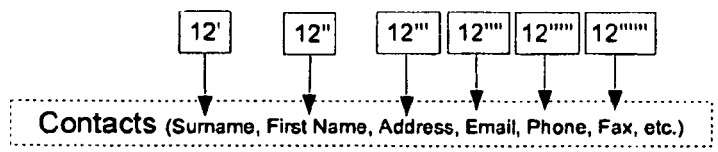
Figure 5:
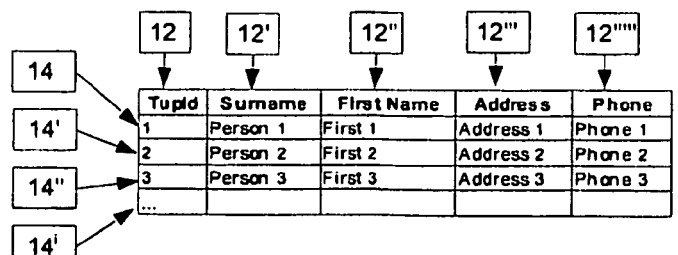

Some specific examples will now be given of how in detail "inclusive inheritance" and "selective inheritance" are internally performed by the framework. That is to say examples of how the framework operates to the advantage of the program developer without him or her having to be aware of the specific location in which data is stored. The following examples address the case in which all database tables or entries with the attribute "actual" hitherto, indeed have a physical representation.

This explanation will be given with reference to FIG. 8.

EXAMPLE 1

Inclusive Inheritance

The method by which a specific application performs a query on an "inclusively inherited" database table is described, taking as an example the database table "Contacts", labeled 36, within "Application: Car Selling", labeled 42 having the following properties:

The database table 36 is "inclusively inherited".
This inherited database table extends the table fields of the parent database table by the table field "Owning car", labeled 50. The only physical entry of this database table is the tuple consisting of the the table field "TupId", labeled 52, carrying the entry "2" and the table field "Owning Car" carrying the entry "Brand1-Model1 ".

The query shall be as follows:
Return all tuples including the table fields "Surname", "First Name", "Address", "Phone" and "Owning Car" with the following constraint: The table field with the name "First Name" shall be equal to the entry "William". This query activates the following sequence:
1) The table field "First Name" is identified to be inherited.
2) The inheriting database table of the table field "First Name" is identified to be the database table "Contacts" 22 within the database table specifications.
3) The query is performed on the database table identified in 2). The tuples resulting from the query include table fields which are present in, i.e. inherited from, the database table on which the query is performed and which match the query. Hence, all table fields are queried except for the table field "Email". The result is one tuple carrying the unique key table field "TupId" of the entry "1", "Surname" with the entry "Jones", "First Name" with the entry "William", "Address" with the entry "West Way 2" and "Phone" with the entry "612/216".
4) The IDs of the result of 3) are searched for in the originally queried database table's "TupId". The "TupId" with entry "1" is not contained in said database table.
5) The final result is equal to the result of 3) and, as a consequence of 4), being extended by the table field "Owning cars" with an entry left blank.

EXAMPLE 2

Inclusively Inheritance

As another example, the same query as in "Example 1" is performed only differing in the entry of the query-"Stephen" instead of "William":
Return all tuples including the table fields "Surname", "First Name", "Address", "Phone" and "Owning Car" with the following constraint: The table field with the name "First Name" shall be equal to the entry "Stephen".

This query activates the following internal sequence within the framework:
1) Same as in 1) of Example 1.
2) Same as in 2) of Example 1.
3) The query is performed on the database table identified in 2). The tuples resulting from the query include table fields which are present in, i.e. inherited from, the database table on which the query is performed and which match the query. Hence, all table fields are queried except for the table field "Email". The result is one tuple carrying the unique key table field "TupId" of the entry "2", "Surname" with the entry "McPherson", "First Name" with the entry "Stephen", "Address" with the entry "East Way 3" and "Phone" with the entry "476/674".
4) The TupIds of the result of 3) are searched for in the originally queried database table's "TupId". The "TupId" with entry "2" is found, comprising the table field "Owning cars" with the entry "Brand1-Model1".
5) The final result is equal to the result of 3) and, as a consequence of 4), being extended by the table field "Owning cars" with the entry "Brand1-Model1".

EXAMPLE 3

Selective Inheritance

The method of performing a query on a selectively inherited database table will now be described, taking as an example the database table "Clients", labeled 34 within application "Insurance", 40, having the following properties:
Database table 34 "selectively" inherits "Contacts", 232 within the same application.
Database table 34 extends the table fields of the inheriting database table by the table field "Insurance Number", labeled 48. The physical entries of this database table are the tuple carrying the table fields "ID" with the entries "2" and "3" and "Insurance Number" with the entries "123/456" and "123/654".

The query shall be as follows:
Return all tuples including the table fields "Surname", "First Name" and "Insurance Number" with the following constraint: The table field with the name "First Name" shall be equal to the entry "William".

This query activates the following internal sequence within the framework:
1) The table field "First Name" is identified to be inherited.
2) The parent database table for the table field "First Name" is identified to be the database table "Contacts" 32 within the same application.
3) The query is performed on the database table 32 identified in 2). The details relating to the performing of the query of database table 32 is described in "Example 1". The tuples resulting from the query include table fields which are present in, i.e. inherited from, the database table on which the query is performed and which match the query. Hence, all table fields are queried except for the table field "Email". The result is one tuple carrying the unique primary key table field "ID" of the entry "1", "Surname" with the entry "Jones" and "First Name" with the entry "William".
4) The IDs of the result of 3) are searched for in the originally queried database table's "TupId". The "TupId" with entry "1" is not contained in said database table.
5) As a consequence of 4), the final result is empty.

EXAMPLE 4

Selective Inheritance

As another example for "selectively" inherited tables, the same query as in "Example 3" is performed only differing with respect to the entry "Stephen" instead of "William":

The query can be formulated as follows: Return all tuples including the table fields "Surname", "First Name" and "Insurance Number" with the following constraint: The table field with the name "First Name" shall be equal to the entry "First 2".

This query activates the following sequence:
1) Same as in 1) of Example 3.
2) Same as in 2) of Example 3.
3) The query is performed on the database table identified in 2). The tuples resulting from the query include table fields which are present in, i.e. inherited from, the database table on which the query is performed and which match the query. Hence, all table fields are queried except for the table field "Email". The result is one tuple carrying the unique primary key table field "TupId" of the entry "2", "Surname" with the entry "McPherson" and "First Name" with the entry "Stephen".
4) The TupIds of the result of 3) are searched for in the originally queried database table's "TupId". The "TupId" with entry "2" is found, comprising the table field "Insurance Number" with the entry "123/456".
5) As a consequence of 4), the final result is equal to the result of 3) which is extended by the table field "Insurance Number" with the entry "123/456".

As initially noted, the two applications considered in the example 3 handling of insurance and handling car selling could be completely separate from one another and could be operated in one business. The framework provides completely general capabilities and can be used in applications radically different from car selling and insurance.

For example, another application, which can be run on the same framework, could be a medical practice. A medical practitioner might typically be interested in the name, address, phone number and e-mail address of his patients but of course also needs information such as sex, prescriptions issued, illnesses treated, operations performed, allergies, blood group and probably many other details. Thus the framework is of particular benefit to program development and program developers, because it provides them with the possibility of generating tables in a structured manner but completely free of constrains and, as stated, without having to concern themselves with the specific locations, where data is physically stored.

Figure 7:
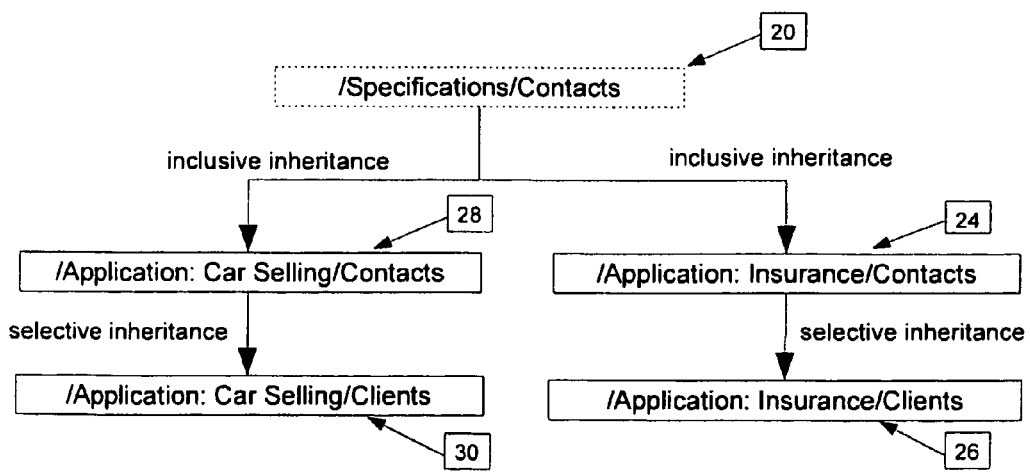
Figure 8:
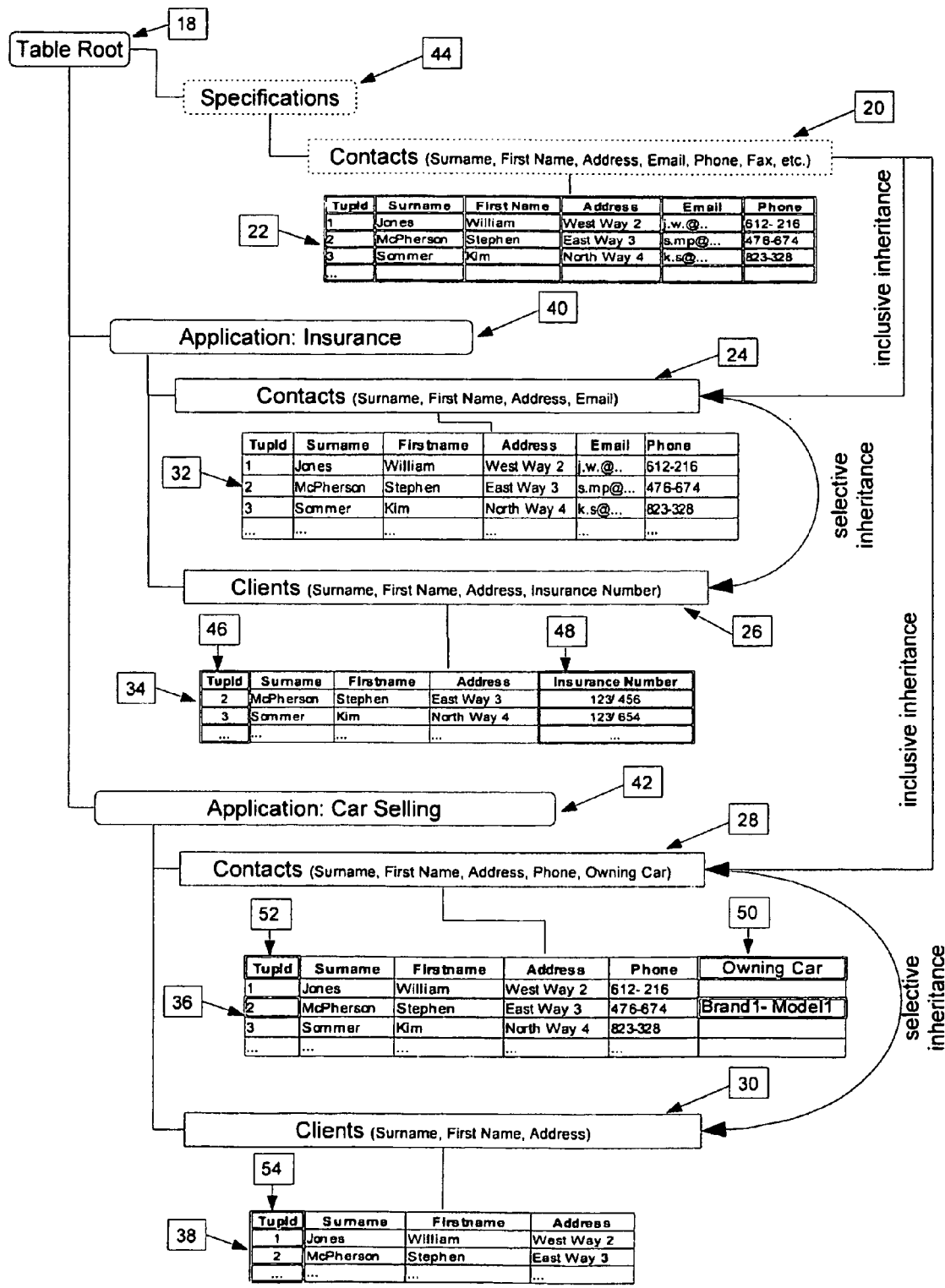

Depending on how a family tree such as in FIG. 7 looks like in terms of how many "generations" it comprises, problems can arise with the speed of operation slowing down. For this reason, there is an alternative way of how the family tree can be stored physically:

All data included by the 5 tables of FIG. 8 can be stored in one single combined table as shown in FIG. 11. To understand the structure of this table, a further look-up database table can be used, such as shown in FIG. 12. In order to see which field ID in 56 within the combined database table uniquely belonging where, one looks up the field ID within the look-up table in 58 and then identifies the table within the hierarchy of FIG. 6 or FIG. 8 using the table field 60 in FIG. 12 and identifies the field of the table within the hierarchy using the table field 62.

Figure 6:
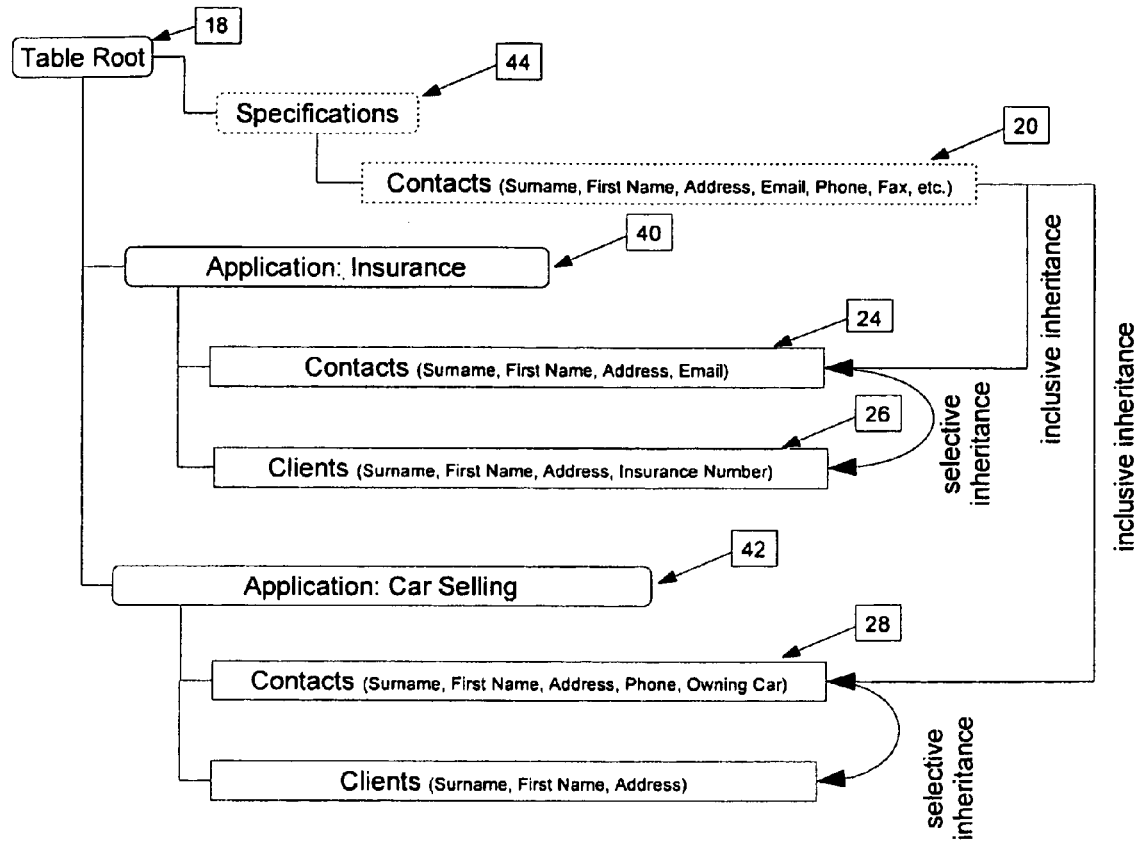

There are however two fields within the combined database table and the look-up table, which can not be found within the respective tables of the hierarchy in FIG. 6 or FIG. 8, which are the fields labeled 64 and 66. If a table is inherited selectively, the information about the state of a tuple being selected has to be carried within at least one further field within the look-up table. An intuitive way chosen for this example is the usage of one field for each table, which is selectively inherited which are the fields 64 and 66 for the tables "/Application: Insurance/Clients" and "/Applications: Car Selling/Clients".

For performance reasons, it might be of advantage to carry the state of selection in a single field for many selectively inherited database tables. One possible way to achieve this is the usage of binary operations.

By now, all required information is given to perform all major operations.

The application using the framework does not notice, which approach is being used, the "many physical database tables" approach or the combined database table approach.

However, the concept of combined database tables also has drawbacks. The bigger a family tree grows (by including many child database tables defining further fields themselves), the larger becomes the number of "blind" entries such as 68 within each tuple of a combined database table. In extremes, the number of "bind" entries can exceed the number "real" entries by far.

The framework presented in this teaching permits the family tree as in FIG. 7 to be cut at any position. As an example, a cut off branch of the family tree in FIG. 7 is shown in FIG. 13. The combined database table for this cut off branch is shown in FIG. 14 with the corresponding look-up database table in FIG. 15. The "blind" entry 68 is gone.

A combined database table can be treated as a usual parent database table or a usual child database table with respect to the "rest" of the tree, where the branch was cut off.

For a database table structure including many branches, it is certainly sufficient to provide only one look-up database table for all branches. In this case, an additional field within the look-up database table would be required to identify the individual combined database table.

Figure 16:
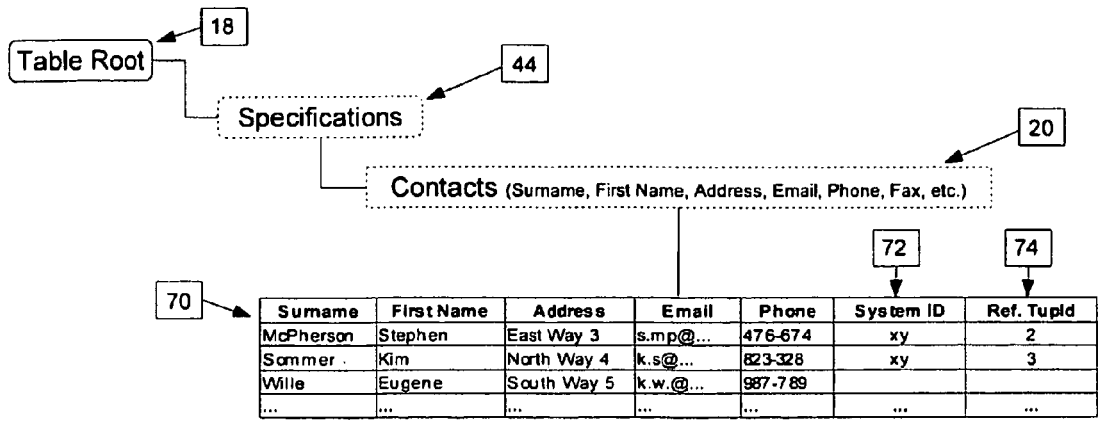

The framework presented yields further big potentials in terms of interacting with further systems operating an equal framework using the same plurality of centrally provided database table specifications. A detail of an example for a system interacting with a further system is shown in FIG. 16.

In this example, the further system shall be the example in FIG. 8. The system of FIG. 16 and the further system of FIG. 8 make use of the same database table specification, indicated by 44 and 20. The basic table 70 of the system consists of only different data (i.e "Wille") compared to the further system of FIG. 16.

Two additional fields, 72 including the reference to the further system and 74 including the tuple id within the respective basic table of the further system, allow a unique reference of any tuple within the own framework to any further system using an equal framework and the same plurality of DTSs.

The further system of FIG. 8 shall be referred to as "xy", which could be a unique identification throughout the world. Within the basic table 70, there are the well known tuples "McPherson" and "Sommer" from the further system in FIG. 8, which are uniquely referenced using 72 and 74. The entries for "McPherson" and "Sommer" in the basic table 70 are only stored for the sake of caching or offline operation. The actual entries for "McPherson" and "Sommer" are stored in the basic table 22 of FIG. 8.

An example for the benefit of this feature would be a company using a system operating the framework for storing contact details. An employee of this company might use another system operating an equal framework at home storing private contact details. The employee could now have a mobile device running a third system operating an equal framework as well, where he or she would like to have both, the contact details from work and the contact details from home. The third system running on the mobile device in this example would only include entries referencing other systems, in this case, the system at work and the system at home. Still, the employee only has one application on the mobile device to deal with.

Figure 17:
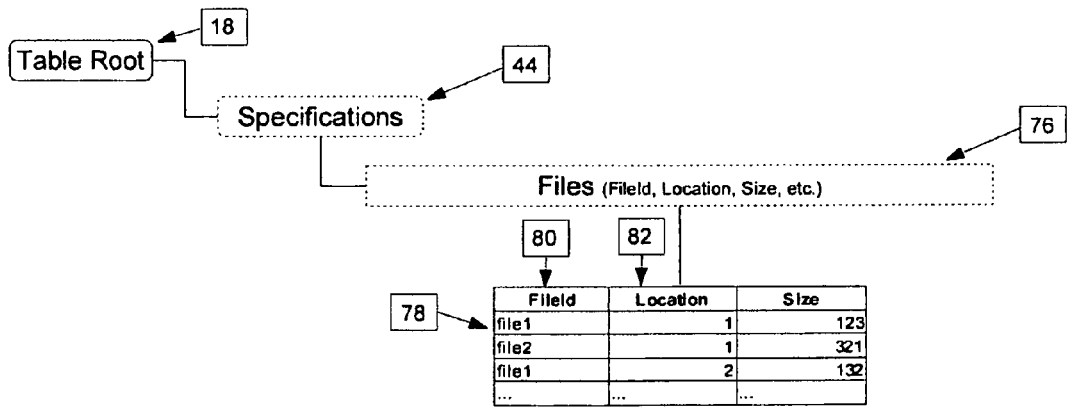

Furthermore, specific database table specifications allow the definition of certain services, the framework provides for individual specific database table specifications. An example is shown in FIG. 17. The specific database table specification 76 specifies the storage of binary data for each tuple within the basic table 78, generated from the database table specification 76. The framework for example uses a backend database to store large objects (assuming that the backend database supports such operations).

Figure 18:
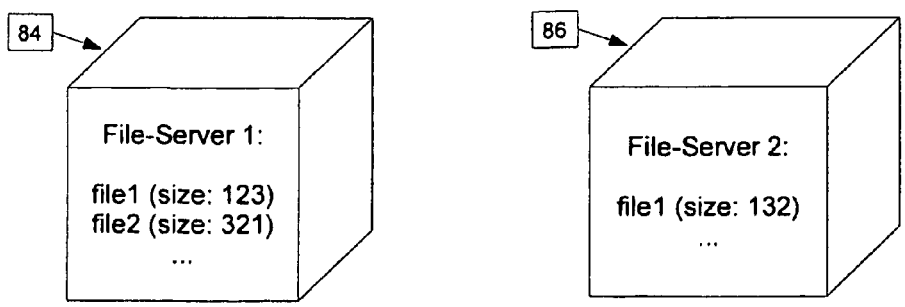

However, it is often preferred to use one or more file-servers for storing binary data. An example for the implementation of several file-servers is shown in FIG. 17 and FIG. 18:

If binary data in conjunction with a tuple within the basic table 78 is requested, the framework locates the corresponding file using a Meld 80 to uniquely identify a file being stored at a location 82, which in this example includes one of the file-servers 84 or 86.

The benefits using the framework as in this example are as follows:

Many applications need binary data for operation. An application using the framework presented and needing to handle binary data can derive from a database table specification as in 76 an application specific database table and address a binary file in the same way as addressing a ordinary tuple. The framework can then be requested to provide a streaming object for each tuple within this application specific database table.

In general, there are many possibilities and parameters when storing binary data such as using a database or using a file-server, if so which file-server and how to access it etc.

Whatever choice is made when using the framework of this invention, all applications based on the framework do not notice how binary data is store at the end. The user operating the system defines and sets up his or her preferred way of storing binary data once and all adapt to it without noticing.

In addition, further database table specifications can be derived from the database table specification 76: There could be database table specifications containing media data, such as MP3 or video data. A variety of applications e.g. could be used to access an MP3 library provided by the framework using the corresponding database table specification. There could also be a variety of devices such as mobile devices accessing this library. The list of examples where those features could be used is practically never-ending.

Figure 19:
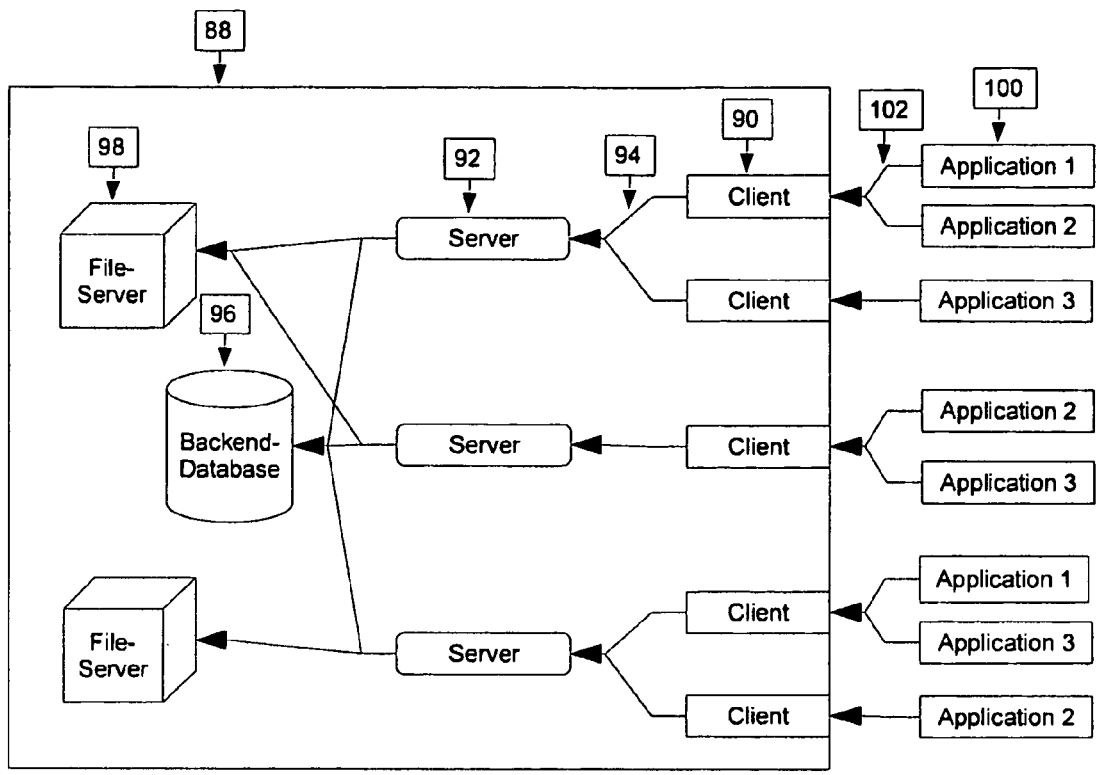

FIG. 19 shows as an example what a framework of this invention, labeled 88, can consist of:

Clients, labeled 90, are connected to servers 92 using a protocol based communication layer, symbolized with 94. The servers 92 are using a backend-database system 96 and two file-servers 98. Eventually, many individual applications 100 are using the framework 96 as a common basis, accessing it via an application programming interface (API), labeled 102.

Figure 20:
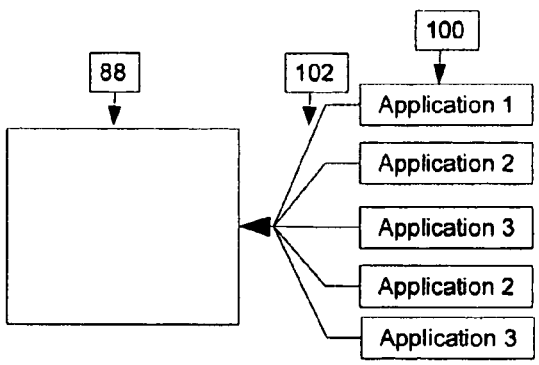

A framework in more general is shown in FIG. 20. It can be operated on a single computer system. Mobile devices are examples for a minimized operation environment for such a framework.

Figure 21:
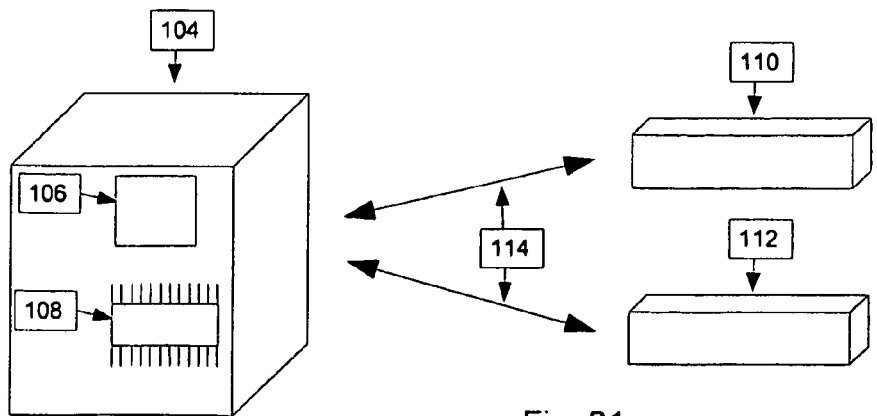

Turning to the last FIG. 21, there is shown a computer system, labeled 104. It consists of a processor 106 and memory 108 operatively coupled to the processor. Furthermore, there is shown a program carrier, labeled 110, and more general by a computer readable medium 112, both being computer readable as symbolized with the reference numeral 114.

The concept underlying this description is of particular interest for the framework provider. He is able to provide the framework with general applicability to an unrestricted number of possible applications, indeed a vast number of applications of which he is not even aware. Should a specific program developer feel that a database table specification should be added or extended, he can make a suitable proposal to the framework provider and the framework provider can consider the proposal on its merits and, if convinced thereof, can incorporate it to the advantage of all program developers. Even if the framework provider decides not to implement the proposal, there is nothing to stop the individual program developer using it in his programs, because he can provide database tables which incorporate his ideas for database table structures for the particular application or applications for which he is responsible. Of course, in this case, the relevant information can not be intrinsically shared with other applications, developed within the umbrella of the framework.

List of Abbreviations used herein:

| Abbreviation | Explanation |
| --- | --- |
| ASDT | application specific database table |
| BDT | basic database table |
| CDT | child database table |
| DTD | database table definition |
| DTS | database table specification |
| PDT | parent database table |
| PRCDT | physical representation of said child database table |
| PRPDT | physical representation of said parent database table |
| RTTF | referenced-tuple table field |
| SIDTF | system-identification table field |
| TFID | table field identification |
| TFID | table field identification |
| TFS | table field specification |
| TID | table identification |
| TupId | tuple identification |

The invention claimed is:

1. A method for providing or operating a framework to provide a basis for the realization of independently developed programs, said framework operating with at least one database table specification (DTS), each said DTS being centrally provided and comprising at least one table field specification (TFS), each said TFS having a unique table field identification (TFID) within said DTS, wherein:
(a) a selection of at least one table field specification (TFS) within said DTS is used to derive a database table definition (DTD), said DTD including said selection of at least one TFS;
(b) the framework provides or creates an application specific database table (ASDT) from said DTD, said ASDT comprising at least one table field (TF) generated from said selection of at least one TFS,
(c) the framework provides or creates a basic database table (BDT) from said DTS, said BDT comprising at least TF(s) generated from said selection of at least one TFS,
(d) a second selection of at least one TFS within said DTS is used to derive a second DTD, said second DTD including said second selection of said at least one TFS;
(e) the framework provides or creates a second ASDT from said second DTD, said second ASDT comprising at least one TF generated from said second selection of said at least one TFS,
(g) third selection of at least one TFS within one of a DTD and a second DTD is used to derive third DTD, said third DTD including said third selection of at least one TFS, (h) the framework provides or creates a third ASDT from said third DTD, said third ASDT comprising at least one TF generated from said third selection of at least one TFS, (i) one of a BDT, an ASDT, a second ASDT and a third ASDT is used to act as a parent database table (PDT) or as a child database table (CDT);

(j) a CDT is derived from a PDT as in one of method steps (a) and (b), in method steps (d) and (e) and in method steps (g) and (h) to form a family tree of database tables;

(k) said framework comprises at least one said family tree and comprises at least one PDT and at least one CDT, each said PDT and each said CDT having a table identification which is unique within said framework;

(l) the framework provides or creates a physical representation from said PDT (PRPDT) within a database system, said PRPDT comprising a database table being provided or created within said database system, said database table comprising at least one TF for each TF being defined within one of a DTS, a DTD, a second DTD and a third DTD used to provide or create said PDT as in one of the method steps (a) and (b), in method steps (d) and (e), and method steps (g) and (h) and (m) each said TF within said PDT being uniquely linked to said at least one TF within said PRPDT.

2. A method according to claim 1, wherein (f) the framework alters said BDT by adding at least one TF generated from said second selection of at least one TFS, each said TF to be added having to meet the following condition: said TF to be added is not already existing within said BDT.

3. A method according to claim 1 wherein;
the framework provides or creates a fourth TF within said PRPDT containing a tuple identification (TupId), said TupId being unique for each tuple within the PRPDT;

(p) the framework provides or creates a physical representation from said CDT (PRCDT) within said database system, said PRCDT comprising a database table being provided or created within said database system, said database table comprising at least one TF for each TF being defined within one of a DTS, a DTD, a second DTD and a third DTD used to provide or create said CDT as in method steps (a) and (b), in method steps (d) and (e), in method steps (g) and (h) and;

(q) each said TF within said CDT being uniquely linked to said at least one TF within said PRCDT and;

(r) the framework provides or creates a fifth TF within said PRCDT containing a TupId, said TupId being unique for each tuple within the PRCDT.

4. A method according to claim 1 wherein;
(s) the framework provides or creates from said CDT a physical representation within the database system from method step (l), the PRPDT from method step (l) being altered by adding at least one TF for each TF defined within done of a DTS, a DTD, a second DTD and a third DTD used to provide or create said CDT as in any one of methods steps (a) and (b), (d) and (e), and (g) and (h) to form a combined database table, and (t) each said TF within said CDT being uniquely linked to said at least one TF within said combined table.

5. A method for providing or operating a framework to provide a basis for the realization of independently developed programs, said framework operating with at least one database table specification (DTS), each said DTS being centrally provided and comprising at least one table field specification (TFS), each said TFS having a unique table field identification (TFID) within said DTS, wherein:

(a) a selection of at least one table field specification (TFS) within said DTS is used to derive a database table definition (DTD), said DTD including said selection of at least one TFS;

(b) the framework provides or creates an application specific database table (ASDT) from said DTD, said ASDT comprising at least one table field (TF) generated from said selection of at least one TFS, (c) the framework provides or creates a basic database table (BDT) from said DTS, said BDT comprising at least TF(s) generated from said selection of at least one TFS, wherein;

at least one DTS is used as a connecting DTS being an interface for said framework to interact with a second system, said second system operating a second framework, said connecting DTS being used to generate a connecting BDT within said framework and to generate a second BDT, said second BDT being located within said second system operating said second framework and said second system having an identification, said system identification being used to identify said second system, wherein;

(y) said framework creates or provides a system-identification TF (SIDTF) within said connection BDT, said SIDTF being used for storing said identification of said second system and (z) said framework creates or provides a referenced-tuple TF (RTTF) within said connection BDT, said RTTF being used for storing a unique tuple identification (TupId), said TupId identifying a tuple within said further BDT.

6. A non-transitory program carrier storing a computer program enabling a program developer to operate a framework to provide a basis for the realization of independently developed programs, said framework operating with at least one database table specification (DTS), each said DTS being centrally provided and comprising at least one table field specification (TFS), each said TFS having a unique table field identification (TFID) within said DTS, wherein said non-transitory computer program is adapted to enable the following method:

(a) a selection of at least one table field specification (TFS) within said DTS is used to derive a database table definition (DTD), said DTD including said selection of at least one TFS; (b) the framework provides or creates an application specific database table (ASDT) from said DTD, said ASDT comprising at least one table field (TF) generated from said selection of at least one TFS, (c) the framework provides or creates a basic database table (BDT) from said DTS, said BDT comprising at least TF(s) generated from said selection of at least one TFS, (d) a second selection of at least one TFS within said DTS is used to derive a second DTD, said second DTD including said second selection of said at least one TFS; (e) the framework provides or creates a second ASDT from said second DTD, said second ASDT comprising at least one TF generated from said second selection of said at least one TFS~(g) third selection of at least one TFS within one of a DTD and a second DTD is used to derive third DTD, said third DTD including said third selection of at least one TFS, (h) the framework provides or creates a third ASDT from said third DTD, said third ASDT comprising at least one TF generated from said third selection of at least one TFS, (i) one of a BDT, an ASDT, a second ASDT and a third ASDT is used to act as a parent database table (PDT) or as a child database table (CDT); (j) a CDT is derived from a PDT as in one of method steps (a) and (b), in method steps (d) and (e) and in method steps (g) and (h) to form a family tree of database tables; (k) said framework comprises at least one said family tree and comprises at least one PDT and at least one CDT, each said PDT and each said CDT having a table identification which is unique within said framework; (l) the framework provides or creates a physical representation from said PDT (PRPDT) within a database system, said PRPDT comprising a database table being provided or created within said database system, said database table comprising at least one TF for each TF being defined within one of a DTS, a DTD, a second DTD and a third DTD used to provide or create said PDT as in one of the method steps (a) and (b), in method steps (d) and (e), and method steps (g) and (h) and (ln) each said TF within said PDT being uniquely linked to said at least one TF within said PRPDT.

7. A computer system having a processor and enabling a program developer to operate a framework to provide a basis for the realization of independently developed programs, said framework operating with at least one database table specification (DTS), each said DTS being centrally provided and comprising at least one table field specification (TFS), each said TFS having a unique table field identification (TFID) within said DTS, wherein said computer system comprising:

a memory operatively coupled to the processor and storing a computer program adapted to enable the following method:

(a) a selection of at least one table field specification (TFS) within said DTS is used to derive a database table definition (DTD), said DTD including said selection of at least one TFS; (b) the framework provides or creates an application specific database table (ASDT) from said DTD, said ASDT comprising at least one table field (TF) generated from said selection of at least one TFS, (c) the framework provides or creates a basic database table (BDT) from said DTS, said BDT comprising at least TF(s) generated from said selection of at least one TFS, (d) a second selection of at least one TFS within said DTS is used to derive a second DTD, said second DTD including said second selection of said at least one TFS; (e) the framework provides or creates a second ASDT from said second DTD, said second ASDT comprising at least one TF generated from said second selection of said at least one TFS~(g) third selection of at least one TFS within one of a DTD and a second DTD is used to derive third DTD, said third DTD including said third selection of at least one TFS, (h) the framework provides or creates a third ASDT from said third DTD, said third ASDT comprising at least one TF generated from said third selection of at least one TFS, (i) one of a BDT, an ASDT, a second ASDT and a third ASDT is used to act as a parent database table (PDT) or as a child database table (CDT); (j) a CDT is derived from a PDT as in one of method steps (a) and (b), in method steps (d) and (e) and in method steps (g) and (h) to form a family tree of database tables; (k) said framework comprises at least one said family tree and comprises at least one PDT and at least one CDT, each said PDT and each said CDT having a table identification which is unique within said framework; (l) the framework provides or creates a physical representation from said PDT (PRPDT) within a database system, said PRPDT comprising a database table being provided or created within said database system, said database table comprising at least one TF for each TF being defined within one of a DTS, a DTD, a second DTD and a third DTD used to provide or create said PDT as in one of the method steps (a) and (b), in method steps (d) and (e), and method steps (g) and (h) and (m) each said TF within said PDT being uniquely linked to said at least one TF within said PRPDT.

* * * * *

UNITED STATES PATENT AND TRADEMARK OFFICE
CERTIFICATE OF CORRECTION

PATENT NO.       : 8,396,898 B2
APPLICATION NO. : 12/600043
DATED            : March 12, 2013
INVENTOR(S)      : Stefan Becker Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 595 days.

Signed and Sealed this
First Day of September, 2015

Michelle K. Lee
*Director of the United States Patent and Trademark Office*